United States Patent
Klaes

(10) Patent No.: US 10,177,671 B2
(45) Date of Patent: Jan. 8, 2019

(54) MODIFIED DUAL ACTIVE HALF BRIDGE DC/DC CONVERTER WITH TRANSFORMER DC BIAS

(71) Applicant: Carl David Klaes, Canton, MI (US)

(72) Inventor: Carl David Klaes, Canton, MI (US)

(*) Notice: Subject to any disclaimer, the term of this patent is extended or adjusted under 35 U.S.C. 154(b) by 0 days.

(21) Appl. No.: 15/830,653

(22) Filed: Dec. 4, 2017

(65) Prior Publication Data

US 2018/0159435 A1 Jun. 7, 2018

Related U.S. Application Data

(60) Provisional application No. 62/430,960, filed on Dec. 7, 2016.

(51) Int. Cl.
*H02M 3/335* (2006.01)
*H02M 1/08* (2006.01)
*H02M 1/00* (2006.01)

(52) U.S. Cl.
CPC ......... *H02M 3/33584* (2013.01); *H02M 1/08* (2013.01); *H02M 2001/0048* (2013.01); *H02M 2001/0058* (2013.01)

(58) Field of Classification Search
CPC ............. H02M 3/33569; H02M 3/335; H02M 3/33576; H02M 3/33584; H02M 3/33592; H02M 3/33538; H02M 3/33553
See application file for complete search history.

(56) References Cited

U.S. PATENT DOCUMENTS

| | | | |
|---|---|---|---|
| 4,860,184 A | 8/1989 | Tabisz et al. | |
| 5,027,264 A * | 6/1991 | DeDoncker | H02M 3/33584 363/129 |
| 6,370,050 B1 * | 4/2002 | Peng | H02M 3/33576 363/17 |
| 7,638,904 B2 | 12/2009 | Shoji et al. | |
| 7,796,406 B2 * | 9/2010 | Lev | H02M 3/33592 363/132 |
| 8,149,599 B2 * | 4/2012 | Coccia | H02M 3/3376 363/21.02 |
| 8,284,576 B2 | 10/2012 | Danesh-Pajooh-Nejad et al. | |

(Continued)

OTHER PUBLICATIONS

Shen et al., "A Modified Dual Active Bridge Converter With Hybrid Phase-Shift Control for Wide Input Voltage Range", IEEE Transaction on Power Electronics, vol. 31, No. 10, Oct. 2016, pp. 6884-6900.

(Continued)

*Primary Examiner* — Timothy J Dole
*Assistant Examiner* — Sisay G Tiku
(74) *Attorney, Agent, or Firm* — Carrier Blackman & Associates, P.C.; Joseph P. Carrier; Jeffrey T. Gedeon

(57) ABSTRACT

This invention is an improvement upon the modified dual active half bridge (MDAB) DC/DC converter whereby the filter inductor is eliminated. Allowing DC bias in the transformer, the transformer's magnetizing inductance serves a secondary role of filter inductance. Due to the high currents on the low voltage side, the filter inductor is a relatively large component, often close in size to the transformer. Eliminating the filter inductor as presented here represents a significant reduction in the size and cost of the DC/DC converter, and further achieves improved efficiency of operation as losses associate with the filter inductor are also eliminated.

6 Claims, 4 Drawing Sheets

(56) References Cited

U.S. PATENT DOCUMENTS

| | | | |
|---|---|---|---|
| 8,587,975 B2 | 11/2013 | Jain et al. | |
| 8,593,831 B2* | 11/2013 | Rojas | H02M 3/335 363/21.02 |
| 9,083,249 B2* | 7/2015 | Yan | H02M 3/33507 |
| 9,621,056 B2* | 4/2017 | Wu | H02M 3/33507 |
| 9,812,977 B2* | 11/2017 | Ye | H02M 3/33592 |
| 9,876,434 B2* | 1/2018 | Torrico-Bascope | H02M 3/33546 |
| 2007/0008750 A1* | 1/2007 | Chen | H02M 7/4807 363/21.12 |
| 2011/0249472 A1* | 10/2011 | Jain | H02M 3/33584 363/15 |
| 2013/0208512 A1* | 8/2013 | Rojas | H02M 3/335 363/17 |
| 2014/0268899 A1* | 9/2014 | Hosotani | H02M 3/33569 363/17 |
| 2015/0229225 A1* | 8/2015 | Jang | H02M 3/285 363/17 |
| 2015/0365005 A1* | 12/2015 | Panov | H02M 3/33584 307/24 |
| 2016/0254755 A1* | 9/2016 | Deboy | H02M 3/33546 363/21.02 |
| 2017/0155325 A1* | 6/2017 | Shimada | H02J 50/12 |
| 2018/0062430 A1* | 3/2018 | Matsumoto | H02J 50/10 |
| 2018/0278167 A1* | 9/2018 | Deboy | H02M 3/33569 |

OTHER PUBLICATIONS

Huang et al., "Modified Unified PWM Control to Operate the Dual Active Bridge Converters Under ZVS In The Whole Load Range", 2013 IEEE ECCE Asia Downunder Conference, 2013, pp. 620-625.

Han et al., Bi-Directional DC/DC Converters for Plug-in Hybrid Electric Vehicle (PHEV) Applications, 2008 Twenty-Third Annual IEEE Applied Power Electronics Conference and Exposition, 2008, pp. 784-789.

Daneshpajooh et al., "Optimizing dual half bridge converter for full range soft switching and high efficiency", 2011 IEEE Energy Conversion Congress and Exposition, 2011, pp. 1296-1301.

Chakraborty et al., "Analysis and Comparison of Voltage-source and Current-source Asymmetric Dual-Active Half-Bridge Converters", 2014 IEEE Energy Conversion Congress and Exposition (ECCE), 2014, pp. 2072-2079.

Shi et al., "Common-Duty-Ratio Control of Input-Parallel Output-Parallel (IPOP) Connected DC-DC Converter Modules With Automatic Sharing of Currents", IEEE Transaction on Power Electronics, vol. 27, No. 7, Jul. 2012, pp. 3277-3291.

* cited by examiner

MODIFIED DUAL ACTIVE HALF BRIDGE DC/DC CONVERTER WITH TRANSFORMER DC BIAS

CROSS-REFERENCE TO RELATED APPLICATIONS

The present application claims the benefit of priority to U.S. Provisional Patent Application No. 62/430,960, filed Dec. 7, 2016. The entire subject matter of this priority document, including specification claims and drawings thereof, is incorporated by reference herein.

BACKGROUND OF THE INVENTION

1. Field of the Invention

The present disclosure relates to a modified dual active half bridge (MDAB) DC/DC converter for use in a wide variety of applications which is improved in terms of efficiency, size and cost. More particularly, the present disclosure relates to such an improved MDAB DC/DC converter which has a reduced number of components, thereby reducing the size and cost thereof, and which functions more efficiently than conventionally available MDAB DC/DC converters.

2. Background

Many electronic systems require a high voltage to low voltage dc/dc converter, and in many applications the converted is bidirectional. Hybrid electric vehicles and electric vehicles use such a converter as an interface between the high voltage vehicle drive battery and the 12V lighting and accessory battery. Photovoltaic systems are another application, wherein the DC/DC converter interfaces between a low and varying panel voltage to a stable high voltage for an inverter to interface to the ac line. Other applications for a dc/dc converter, such as a battery charger may, not require bidirectional capability but can also benefit from improved efficiency, size and cost.

Some known converters and related devices are disclosed in the following US Patents and IEEE Publications, the disclosures of which are incorporated herein by reference.

| U.S. Pat. No. 4,860,184 | August 1989 | Tabisz et al. | 363/17 |
| --- | --- | --- | --- |
| U.S. Pat. No. 7,638,904 B2 | December 2009 | Shoji et al. | 307/154 |
| U.S. Pat. No. 8,284,576 B2 | October 2012 | Danesh-Pajooh-Nejad et al. | 363/65 |
| U.S. Pat. No. 8,587,975 B2 | November 2013 | Jain et al. | 363/89 |

Y. Shen, X. Sun, W. Li, X. Wu and B. Wang, "A modified dual active bridge converter with hybrid phase-shift control for wide input voltage range", IEEE Transaction on Power Electronics, Vol. 31, No. 10, October 2016, pp. 6884-6900.

J. Huang, Y. Wang, Y. Gao, W. Lei and N. Li, "Modified unified PWM control to operate the dual active bridge converters under ZVS in the whole load range", 2013 IEEE ECCE Asia Downunder Conference, 2013 pp. 620-625.

S. Han and D. Divan, "Bi-Directional DC/DC converters for plug-in hybrid electric vehicle (PHEV) applications", 2008 Twenty-Third Annual IEEE Applied Power Electronics Conference and Exposition, 2008, pp. 784-789

H. Daneshpajooh, A. Bakhshai and P. Jain, "Optimizing dual half bridge converter for full range soft switching and high efficiency", 2011 IEEE Energy Conversion Congress and Exposition, 2011, pp. 1296-1301.

S. Chakraborty and S. Chattopadhyay, "Analysis and comparison of voltage-source and current-source asymmetric dual-active half-bridge converters", 2014 IEEE Energy Conversion Congress and Exposition (ECCE), 2014, pp. 2072-2079.

J. Shi, L. Zhou and X. He, "Common-duty-ratio control of input-parallel output-parallel (IPOP) connected DC-DC converter modules with automatic sharing of currents", IEEE Transaction on Power Electronics, Vol. 27, No. 7, July 2012, pp. 3277-3291.

A dual active bridge topology has been extensively studied and numerous improvements on its operation have been made. One such improvement is the dual active half bridge which reduces the number of switching devices needed. Further, several improvements on the dual active half bridge have been made. The dual active half bridge circuit 100 depicted in FIG. 1 shows one such improvement and the name "modified dual active half bridge" (MDAB) was coined for this topology. This topology, includes: a first half bridge switching circuit 104 with capacitors C1, C2 and switches/transistors Q1, Q2 associated with a first, lower voltage power source Va, a second half bridge switching circuit 106 with capacitors C3, C4 and switches/transistors Q3, Q4 associated with a second, higher voltage power source Vb, a transformer 108 connected between the first and second half bridge switching circuits, a resonant inductor 110 ($L_r$) connected between the first half bridge switching circuit 104 and the transformer 108, and a filter or boost inductor 102 ($L_{dc}$) on the low voltage side. The filter inductor 102 ($L_{dc}$) alters the switching arrangement so that the low voltage side serves the dual purpose of a boost converter. The added boost function provides a means to keep a constant voltage ratio across the transformer under varying input and output voltages. This eliminates a well-known circulating current problem that reduces dual active bridge converter efficiency and, therefore, caused prior conventional converters to be constructed with increased size and cost to make up for the inefficiency.

In a half bridge circuit such as 104 and 106 it is common to refer to the transistor positions of Q1 and Q3 as the high side transistors/switches and C1, C3 are the high-side capacitors. It is also common to refer to the transistors/switches in the position of Q2 and Q4 as the low side transistors while C2 and C4 are the low side capacitors. The common node of the transistors Q1 and Q2 is referred to as the switching node. The switching node of the half bridge 106 is the common connection of transistors Q3 and Q4. The common connection of the capacitors in a half bridge would be referred to as the capacitor center node. A switching node is also referred to as the center node of the transistors so that the center nodes of a half bridge would be known to be the common connection of the capacitors and the common connection of the transistors. The common node of the upper components such as Q3, C3 of a half bridge 106 is known as the upper dc rail while the common node of the lower transistor and capacitor such as Q4, C4 of half bridge 106 is known as the lower dc rail. The power connection to a half bridge is made by connecting the positive side of a dc source or load such as Vb to the half bridge 106 "across the dc rails" or from the upper dc rail to the lower dc rail.

The "modified dual active half bridge" (MDAB) DC/DC converter shown in FIG. 1 is known to provide advantages over conventional DC/DC converters, which advantages are primarily realized in the duty-cycle and phase shift control of the two half bridge switching circuits of the converter. If the duty cycle (D) of the high side switches (Q1 and Q3) is set as in equation (1) below, where n is the transformer turns ratio, then the voltages Vp and Vs' have equal magnitudes during their respective periods as reflected in FIG. 2, which is a diagram depicting principle waveforms of the MDAB converter 100. Vs' is the secondary transformer voltage reflected to the primary by the turns ratio n, while equations (2)-(5) below pertain to voltages V1 to V4 in the waveforms of FIG. 2.

$$D = \frac{nV_A}{V_B} \quad (1)$$

$$v1 = \frac{1-D}{D} \cdot V_A \quad (2)$$

$$v2 = V_A \quad (3)$$

$$v3 = (1-D) \cdot V_B \quad (4)$$

$$v4 = D \cdot V_B \quad (5)$$

When the half bridges are operated in this manner, the current iS flows through a series inductance, which is the sum of the resonant inductor 110 ($L_r$) and the transformer leakage inductance (Llkg). The voltage across this inductance is ($v_p - v_s'$). The balance of voltage across this inductance makes iS a flat top waveform as shown in FIG. 2. The current iS may be described by equations (6) and (7) below.

$$i_S(0) = -\frac{\theta V_A}{\omega L_r} \quad (6)$$

$$i_S(\theta) = \frac{\theta \left(\frac{V_B}{n} - V_A\right)}{\omega L_r} \quad (7)$$

The power transfer across the converter is controlled by phase shift, which may be set by a control unit 112 associated with the DC/DC converter 100. It has been shown that the average power transfer can be estimated by equation (8) below.

$$P_{av} = \frac{V_A \cdot V_B}{n\omega L_r} \cdot \theta \cdot \left(1 - D - \frac{|\theta|}{4\pi D}\right) \quad (8)$$

When Vp leads Vs' power transfer is from $V_a$ to $V_b$ and vice-versa when Vs' leads Vp.

The filter inductor 102 ($L_{dc}$) in FIG. 1 is the boost inductor for the circuit and operates in continuous mode with the current shown as iA in FIG. 2. The current peaks may be estimated by equation (9) below where $P_{av}/V_A$ is the average current.

$$i_{Apk} = \frac{P_{av}}{V_A} \pm \frac{\pi(1-D)V_A}{2\omega L_{DC}} \quad (9)$$

Zero voltage switching (ZVS) is achieved when the total current out of the switching node is positive for high side switches (Q1, Q3) and negative for low side switches (Q2, Q4). For the conventional MDAB DC converter Table 1 below shows the conditions necessary to achieve zero voltage switching of all the transistors.

TABLE 1

| ZVS Conditions |
| --- |
| iS (0) < $iA_{,max}$ |
| iS (θ) > 0 |
| iS (2πD) > $iA_{,min}$ |
| iS (2πD+θ) < 0 |

While the previously proposed MDAB DC/DC converter shown in FIG. 1 provides advantages over other conventional DC/DC converters, it remains a desideratum in the art to provide an MDAB DC/DC converter which is further improved over the conventional MDAB DC/DC converters, including the converter shown in FIG. 1, in terms of size, cost and efficiency of operation.

SUMMARY OF THE INVENTION

It is an object of the present invention to provide an MDAB DC/DC converter which fulfills the discussed desideratum.

According to a first aspect of the present invention there is provided a DC-DC converter comprising:
  a first DC power source and/or load;
  a second DC power source and/or load;
  a first half-bridge switching circuit;
  a second half-bridge switching circuit; and
  a transformer incorporating a series inductance as either leakage inductance or as a separate resonant inductance; wherein
  the first power source or load is connected across a lower capacitor of the first half-bridge switching circuit;
  a first winding of the transformer is connected across center nodes of the first half-bridge switching circuit;
  a second winding of the transformer is connected across center nodes of the second half-bridge switching circuit, and
  the second DC power source and/or load is connected across DC rails of the second half-bridge switching circuit.

Such DC-DC converter according to the first aspect of the present invention is very advantageous over the conventional MDAB DC/DC converter shown in FIG. 1 primarily in that it completely eliminates the filter inductor 102 ($L_{dc}$) and instead allows DC bias in the transformer, whereby the transformer's magnetizing inductance serves a secondary role of filter inductance for the converter. As will be recognized, due to the high currents on the low voltage side of an MDAB DC/DC converter, the filter inductor 102 (LI) included with the conventional MDAB DC converter 100 of FIG. 1 is typically a relatively large component, often close in size to the transformer. Hence, eliminating the filter inductor according to the first aspect of the present invention represents a significant reduction in the size, weight and cost of the DC/DC converter.

Further, another advantage of eliminating the filter inductor is that power losses associated with operations of the filter inductor are also eliminated, allowing for improvements in efficiency of operating the DC/DC converter.

For a more complete understanding of the present invention, the reader is referred to the following detailed description section, which provides details of present exemplary embodiments of the invention.

Intent of Disclosure

Although the following disclosure offered for public dissemination is detailed to ensure adequacy and aid in understanding of the invention, this is not intended to prejudice that purpose of a patent which is to cover each new inventive concept therein no matter how it may later be disguised by variations in form or additions of further improvements. The claims at the end hereof are the chief aid toward this purpose, as it is these that meet the requirement of pointing out the improvements, combinations and methods in which the inventive concepts are found.

DETAILED DESCRIPTION OF THE PRESENT EXEMPLARY EMBODIMENTS

Figure 3:
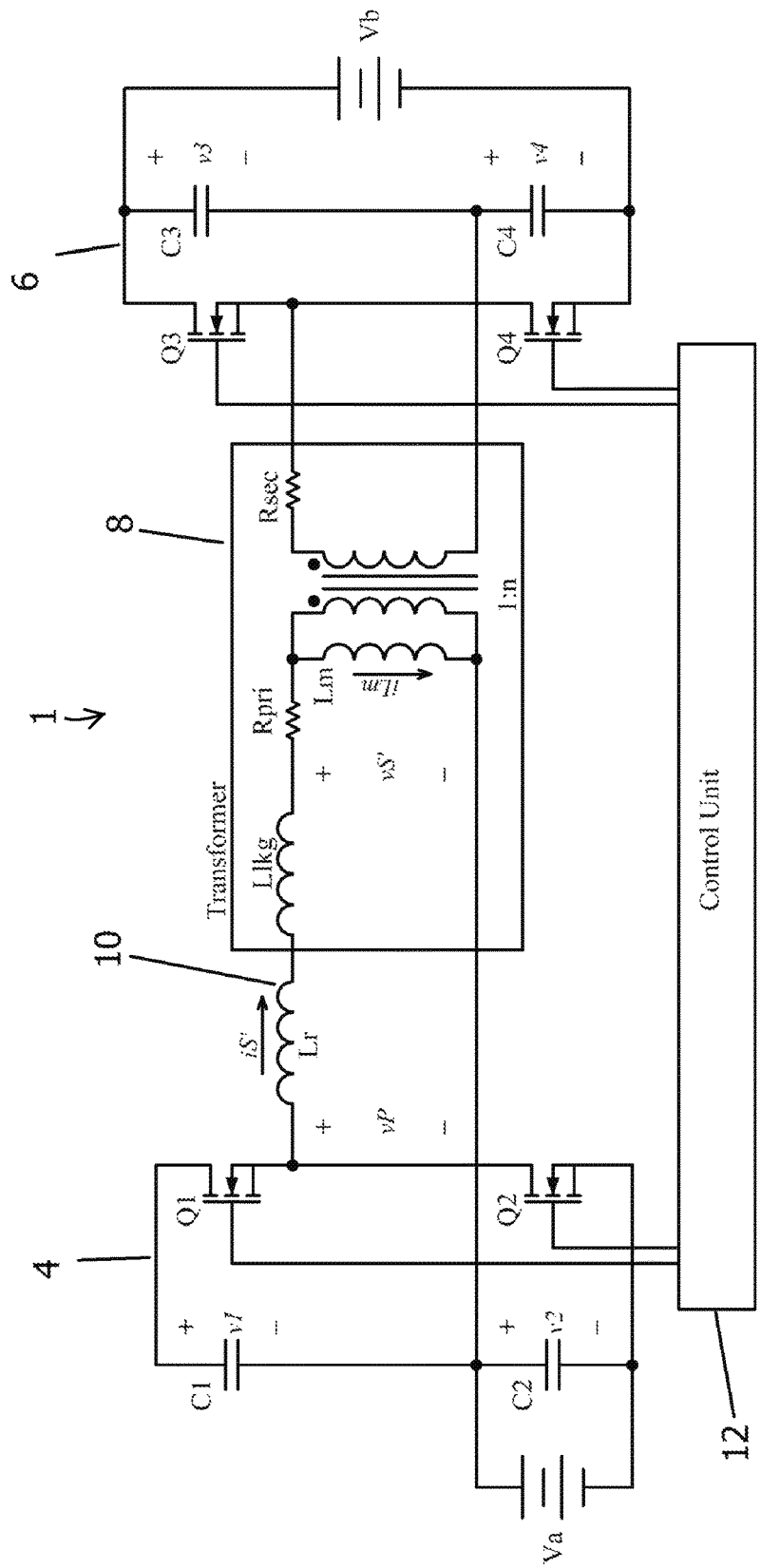
FIG. 3 is a schematic diagram of a Modified Dual Active Half Bridge (MDAB) DC/DC converter according to an exemplary embodiment of the present invention.
Figure 4:
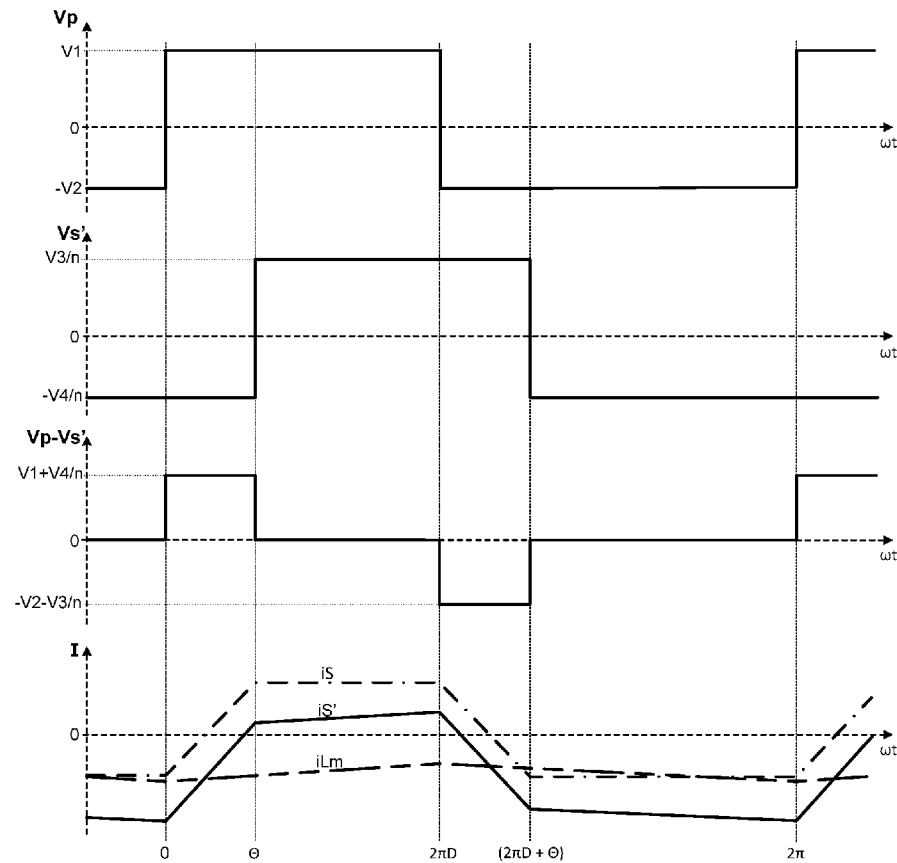
FIG. 4 is a diagram depicting the principle waveforms of the MDAB DC/DC converter of FIG. 3.

FIG. 3 is a schematic diagram of a Modified Dual Active Half Bridge (MDAB) DC/DC converter 1 according to a present exemplary embodiment of this invention. The converter 1 includes many of the same components as the conventional the MDAB DC/DC converter 100 of FIG. 1, including: a first half bridge switching circuit 4 with capacitors C1, C2 and switches/transistors Q1, Q2 associated with a first, lower voltage power source Va, a second half bridge switching circuit 6 with capacitors C3, C4 and switches/transistors Q3, Q4 associated with a second, higher voltage power source Vb, a transformer 8 connected between the first and second half bridge switching circuits, and a resonant inductor 10 ($L_r$) connected between the first half bridge switching circuit 4 and the transformer 8. The converter 1 may further include a control unit 12 which may set a switching duty cycle of both of the half-bridge switching circuits to maintain a voltage balance across the transformer, and which may also set phase shift between the switching of the half bridges to control power flow. The converter 1 may be single or bi-directional, and may be isolated. Further, either or both of the power sources Va, Vb could be replaced or supplemented with a load. FIG. 4 is a diagram depicting the principle waveforms of the MDAB converter 100 of FIG. 3.

Figure 1:
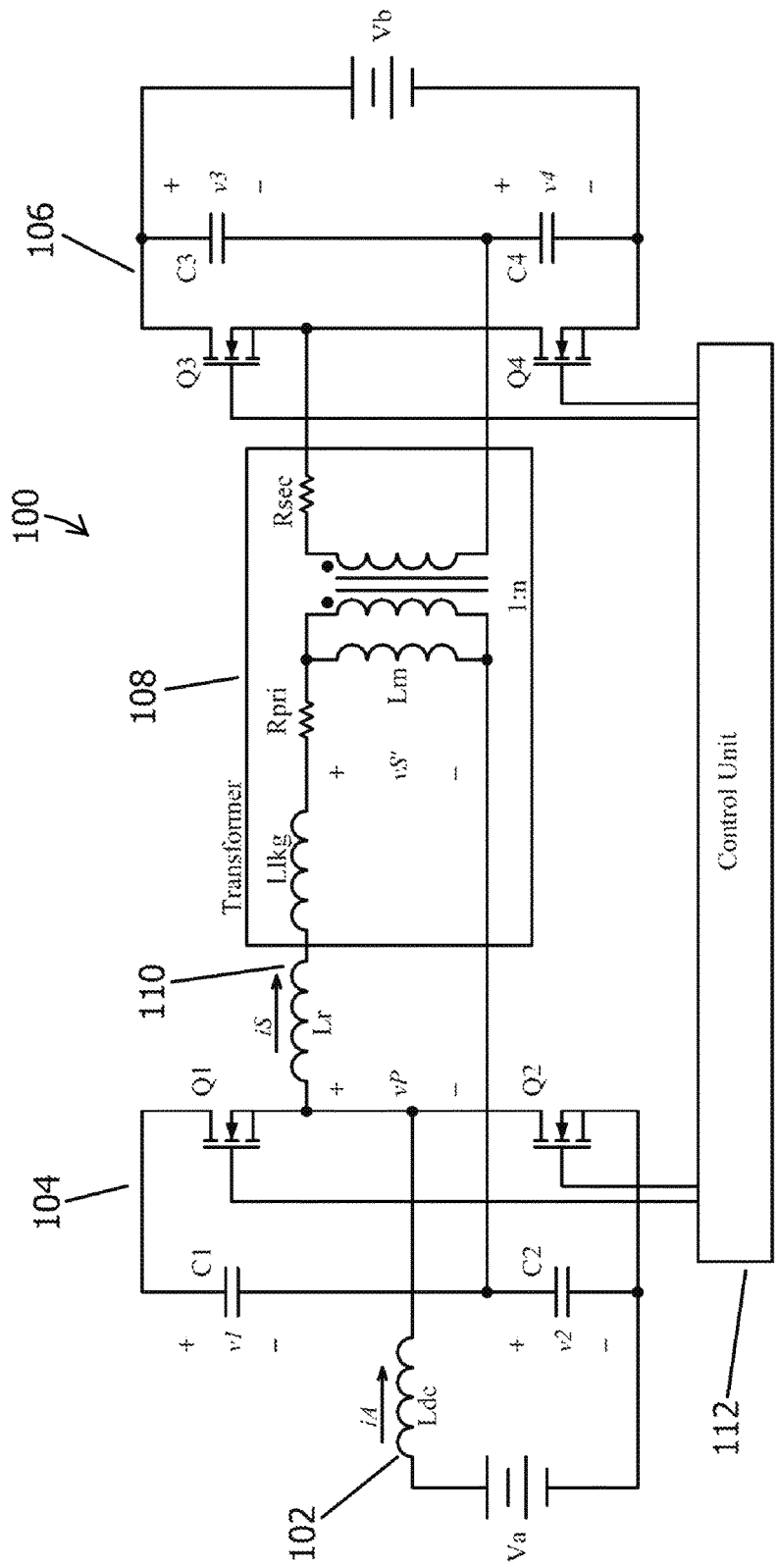
FIG. 1 is a schematic diagram of a conventional Modified Dual Active Half Bridge (MDAB) DC/DC converter.
Figure 2:
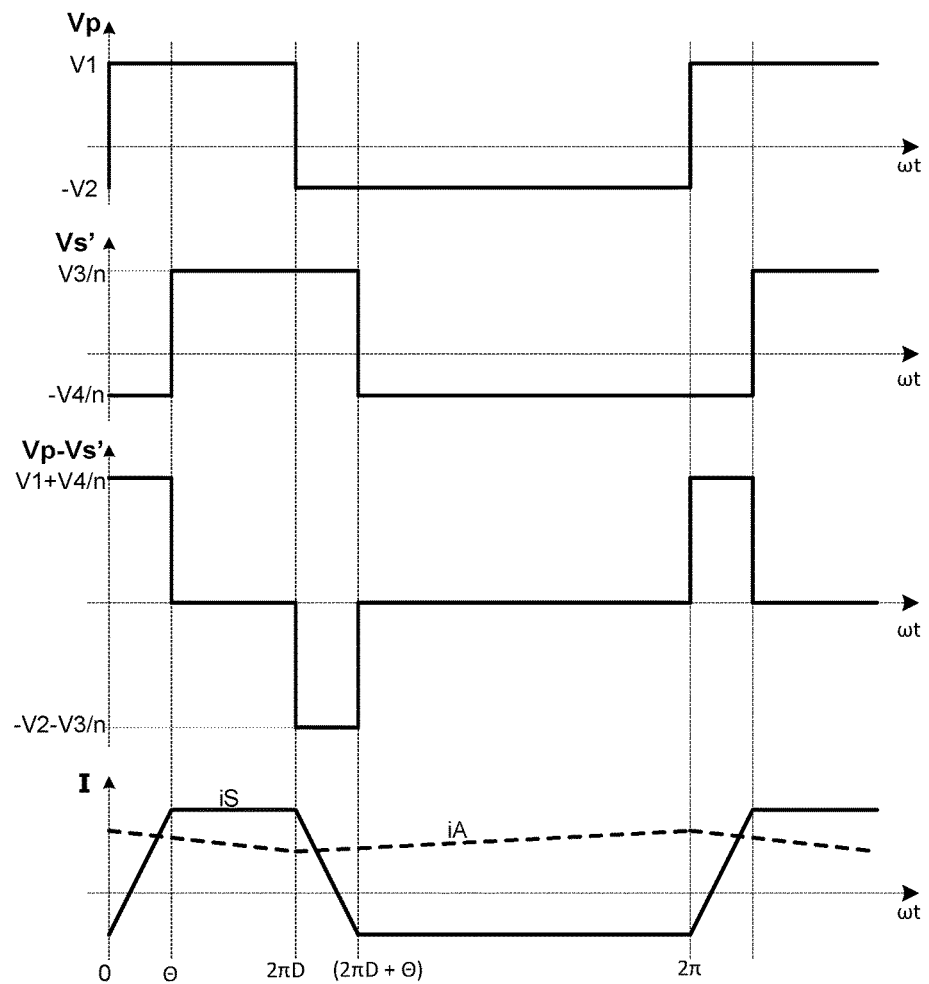
FIG. 2 is a diagram depicting the principle waveforms of the MDAB converter of FIG. 1.

According to an important aspect of the invention, the converter 1 does not include a boost inductor, such as the filter/boost inductor 102 ($L_{dc}$) in the conventional converter 100 of FIG. 1, in association with the first power source Va. Instead the first power source Va is connected directly across the lower capacitor C2, so that $v2=V_A$. With such converter 1, when low side switch Q2 is ON current flows through the transformer mutual inductance, Lm, the transformer leakage inductance, Llkg and the resonant inductance Lr. This forms a boost circuit for charging C1, similar to what occurs in the conventional MDAB DC/DC converter 100 of FIG. 1. Correspondingly, equations (1) through (5) above also hold for the operation of the converter 1 so that voltages v1 through v4 are balanced just as with converter 100 as discussed above.

The current $i_{Lm}$ for the converter 1 is shown in FIG. 4. The average value of $i_{Lm}$ as represented by equation (10) below is the dc bias on the transformer and peak values of $i_{Lm}$ are given by equation (11) below. In the converter 1, the mutual inductance current it, sums with unbiased $i_S$ current as $i_{S'}$ such that $i_{S'}$ for the converter 1 has a negative DC bias as shown in FIG. 4. For instance, equation (12) below shows $i_{S'}(0)$ as the sum of the unbiased $i_S$ current and the boost current $i_{Lm}$. The new $i_{S'}$ waveform of FIG. 4 is described by equation (13) through equation (16) below and the power transfer can be estimated by equation (17) below.

$$i_{Lmavg} = \frac{P_{avg}}{V_A} \qquad (10)$$

$$i_{Lm\_pk} = -\frac{P_{av}}{V_A} \pm \frac{\pi\left(1 - \frac{nV_A}{V_B}\right)V_A}{2\omega L_m} \qquad (11)$$

$$i'_S(0) = -\frac{\theta \cdot V_A}{\omega \cdot L_s} - \left[\frac{P_{avg}}{V_A} + \frac{\pi V_A\left(1 - \frac{nV_A}{V_B}\right)}{2\omega L_m}\right] \qquad (12)$$

$$i'_S(0) = -\left[\frac{\pi(1-D)}{2\omega L_m}V_A + \frac{\theta\left(1 - \frac{\theta}{4\pi D}\right)}{n\omega L_S}V_B\right] \qquad (13)$$

$$i'_S(\theta) = \frac{1}{2\pi\omega D}\left[\frac{\pi(\theta - \pi D)(1-D)}{L_m}V_A + \frac{\theta^2}{2nL_S}V_B\right] \qquad (14)$$

$$i'_S(2\pi D) = \frac{\pi(1-D)}{2\omega L_m}V_A + \frac{\theta^2}{4\pi n\omega L_s D}V_B \qquad (15)$$

$$i'_S(2\pi D + \theta) = -\left[\frac{\theta - \pi(1-D)}{2\omega L_m}V_A + \frac{\theta}{n\omega L_S}\left(1 - \frac{\theta}{4\pi D}\right)V_B\right] \qquad (16)$$

$$P_{avg} = \frac{\theta}{n\omega L_S}\left(V_A V_B - nV_A^2 - \frac{|\theta|}{4\pi n}V_B^2\right) \qquad (17)$$

Now the zero voltage switching (ZVS) range for the converter 1 is determined by $i_{S'}$ for switches Q1 and Q2. The ZVS range for switches Q3 and Q4 is determined by the original $i_S$ equations (6), (7) above since the DC bias does not transfer through the transformer. This is summarized in Table 2 below. By evaluating the equations for $i_{S'}$ and $i_S$ it can be seen that these conditions are always valid and ZVS operation is expected over the full range of operation. However, as known a minimal inductor current is needed to drive the resonant switching transition.

TABLE 2

| ZVS condition |
| --- |
| $i_{S'}(0) < 0$ |
| $i_S(\theta) > 0$ |
| $i_{S'}(2\pi D) > 0$ |
| $i_S(2\pi D+\theta) < 0$ |

It is well known to those skilled in the art that a normal transformer will saturate under DC bias. However, it is also known that by gapping the magnetic core, a DC bias can be tolerated by a transformer. This gapping also increases the leakage inductance $L_{lkg}$ of the transformer 7. For many hard switched converters, increasing the leakage inductance has the negative effect of increasing voltage stress and ringing on the transistors. Conversely, in the case of the converter 1 according to the exemplary embodiment of the present invention, the leakage inductance is actually necessary and is usually increased with the resonant inductance $L_r$ to operate with zero voltage as described above.

The foregoing description is given for clearness of understanding only, and no unnecessary limitations should be understood therefrom, as modifications within the scope of the invention may be apparent to those having ordinary skill in the art and are encompassed by the claims appended hereto.

I claim:

1. A DC-DC converter comprising:
a first DC power source and/or load;
a second DC power source and/or load;
a first half-bridge switching circuit;
a second half-bridge switching circuit; and
a transformer incorporating a series inductance as either leakage inductance or as a separate resonant inductance; wherein
the first DC power source and/or load is connected directly across a lower capacitor of the first half-bridge switching circuit,
a first winding of the transformer is connected across center nodes of the first half-bridge switching circuit,
a second winding of the transformer is connected across center nodes of the second half-bridge switching circuit, and
the second DC power source and/or load is connected across DC rails of the second half-bridge switching circuit.

2. The DC-DC converter of claim 1, wherein the transformer has a magnetizing inductance which filters current to and from the first power source and/or load.

3. The DC-DC converter of claim 1, further comprising a control unit which sets a switching duty cycle of both of the half-bridge switching circuits to maintain a voltage balance across the transformer.

4. The DC-DC converter of claim 3, wherein the control unit also sets phase shift between the switching of the half-bridge switching circuits to control power flow.

5. The DC-DC converter of claim 1, wherein the DC-DC converter is bi-directional with a source side as leading phase and a load side as lagging phase.

6. The DC-DC converter of claim 1 wherein the DC-DC converter is isolated.

* * * * *